Figure 5:
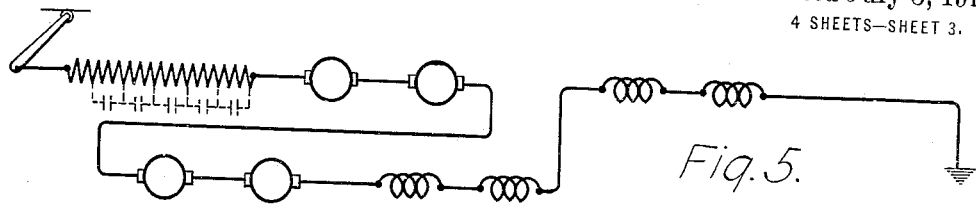

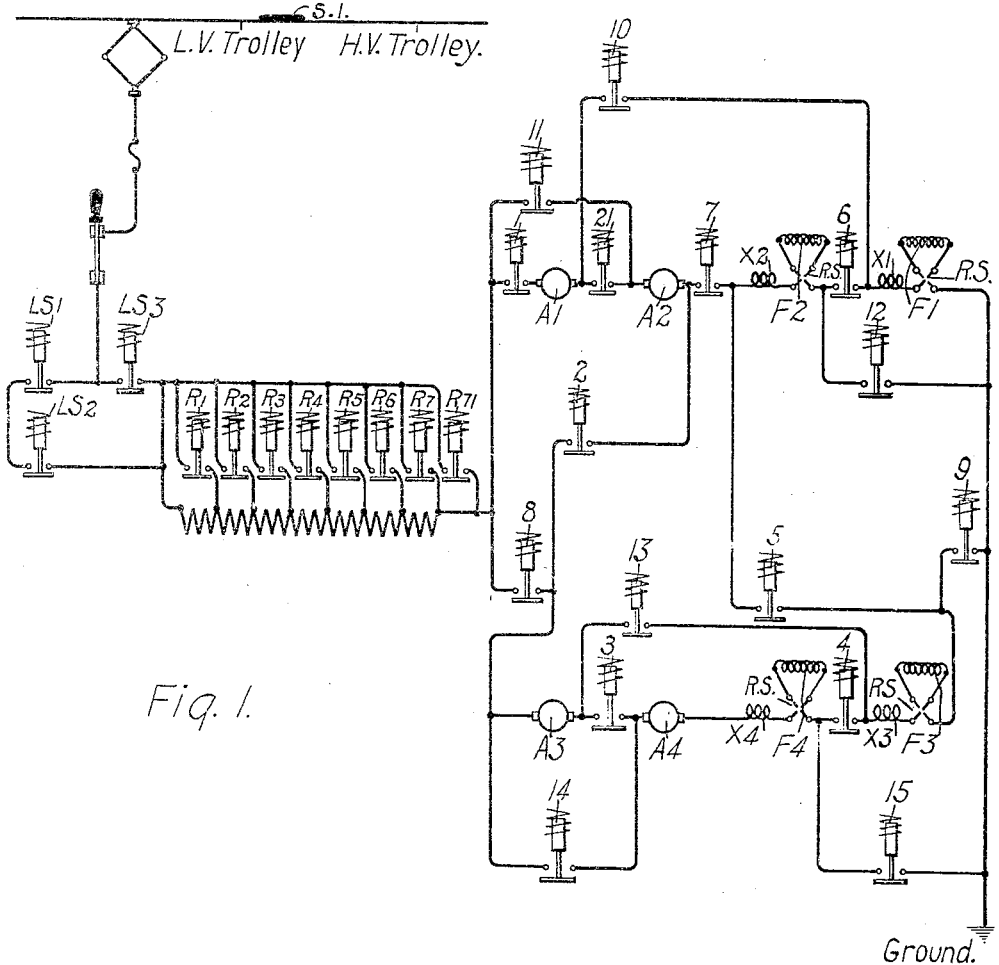

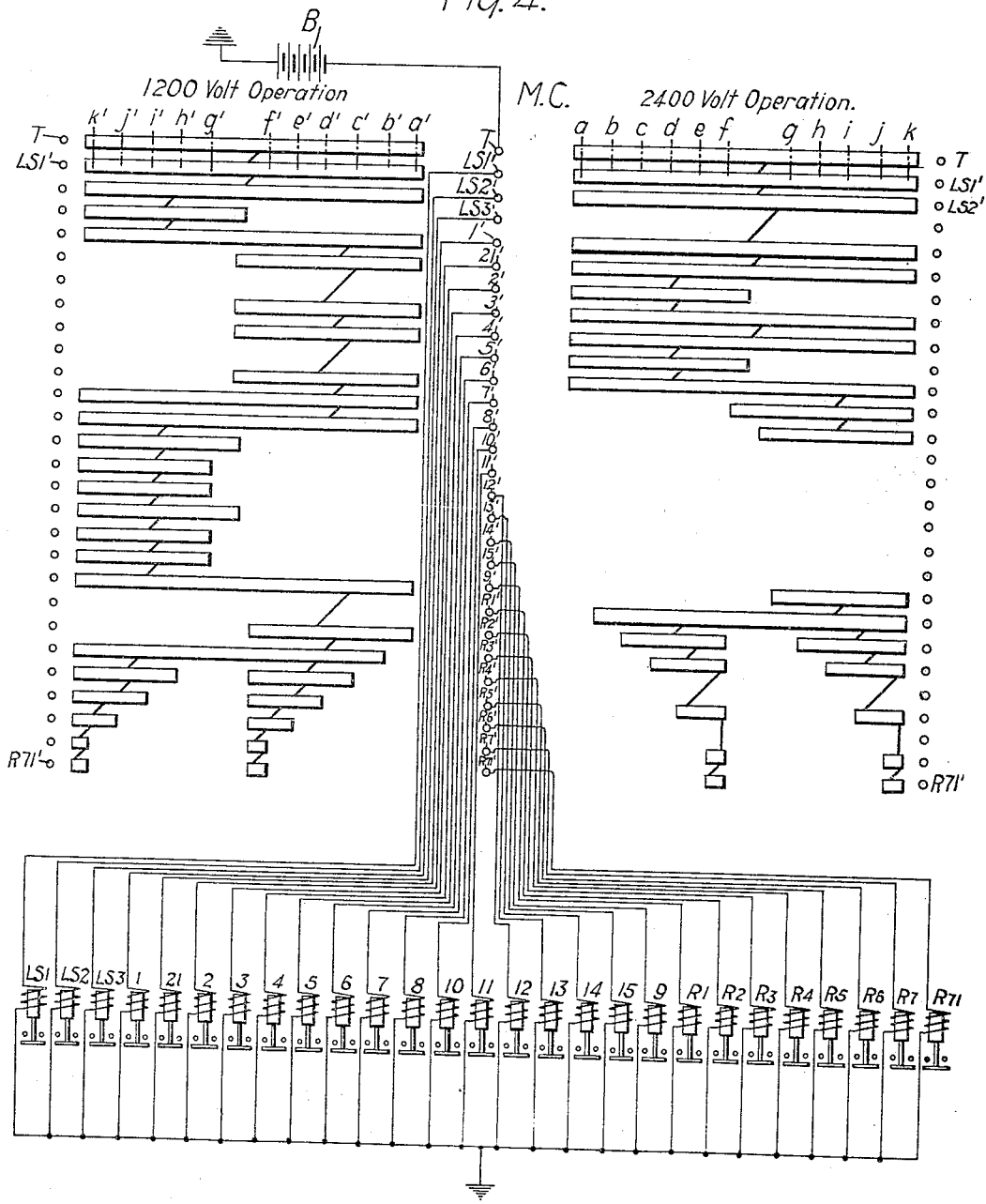

N. W. STORER.
CONTROL SYSTEM.
APPLICATION FILED MAY 11, 1914.

1,231,663.

Patented July 3, 1917.
4 SHEETS—SHEET 4.

WITNESSES:
Fred H. Miller
W. R. Coley

INVENTOR
Norman W. Storer
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,231,663.  Specification of Letters Patent.  Patented July 3, 1917.

Application filed May 11, 1914. Serial No. 837,700.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to control systems for electric motors and it has special reference to control systems that are adapted for employment in high-voltage, direct-current electric railway service.

The object of my invention is to provide, in a system of the above-indicated character, means for permitting the operation of the motors from a plurality of supply circuits of materially different voltages and maintaining the field winding on the "ground" side of the several armatures throughout the operation, whereby minimum voltage strains are imposed on the field windings, thus obviating the necessity of extra insulation of the field coils and reducing the liability of grounding on the motor frames to a great extent.

More specifically stated, the object of my invention is to provide a system of control whereby the motors may be operated from either of two supply circuits, one of which may have a voltage of 2400 and the other 1200 volts, for example, and whereby the motors, when connected to the high-voltage circuit, are initially in series relation and are subsequently disposed in series-parallel relation, and, when connected to the low-voltage supply circuit, are initially in series-parallel circuit relation and are later connected in full parallel, the field windings of all the motors being maintained on the "ground" side of all the armatures throughout either complete operation.

Another object of my invention is to provide a system for accomplishing the above-mentioned objects with a minimum number of switches and a minimum number of circuit changes.

I am aware that, in a broad sense, systems embodying the maintenance of the field windings of a plurality of electric motors on the ground side of the corresponding armatures have been employed heretofore. My invention, therefore, comprises a combination of a plurality of supply circuits of materially different voltages, means for operating a plurality of motors from either circuit, according to whether the electric vehicle is running in interurban or city service, for example, and means for maintaining the field windings on the "ground" side of the armatures in both cases, a minimum number of switches being employed in the system for accomplishing the desired circuit changes.

In the accompanying drawing, Figure 1 is a diagrammatic view of a system of control embodying my invention, the main circuits only being shown; Figs. 2 and 3 are sequence charts of well-known form indicating the sequence of operation of the switches shown in the system of Fig. 1; Fig. 4 is a diagrammatic view of the auxiliary control circuits for operating the system illustrated in Fig. 1, in accordance with the sequence charts of Figs. 2 and 3; and Figs. 5 to 10, inclusive, and Figs. 6$^A$ and 9$^A$, are simple diagrammatic views illustrating various main circuit connections employed in my control system.

Referring to Fig. 1 of the drawing, the system here shown comprises a plurality of supply circuits of materially different voltages respectively marked "LV-trolley" and "HV-trolley", signifying the low-voltage and high-voltage portions of the line, which may be insulated from each other by means of a section insulator SI, or in any other suitable manner; a common return circuit, marked "Ground", for the two supply circuits, a plurality of electric motors respectively having armatures A1, A2, A3 and A4, corresponding main field windings F1, F2, F3 and F4 and auxiliary field magnet windings X1, X2, X3 and X4; a plurality of line switches LS1, LS2 and LS3, preferably of a familiar electro-pneumatically operated type; a plurality of resistor sections, one of which is adapted to be short circuited by a similar switch R1, two of which may be short circuited by a switch R2, and so forth, up to a switch R71, which is adapted to short-circuit all of the resistor sections; a plurality of motor-operating switches 21, and 1 to 15, inclusive; and a plurality of reversing switches, marked "RS", that are severally associated with the main field windings of the various motors.

Reference may now be had to Fig. 4, in which the auxiliary control system shown comprises a master controller MC, which, when moved in one direction, is adapted to connect the motors to the supply circuit of higher voltages and, when moved in the other direction, is adapted to connect them to the supply circuit of lower voltage, the controller being arranged to assume a plurality of positions *a* to *k*, inclusive, and *a'* to *k'*, inclusive, in the respective directions, to energize the magnet coils of the various circuit-changing switches by means of a suitable battery B, and in accordance with the sequence chart of Figs. 2 and 3.

The operation of the master controller MC is simple and well understood by those skilled in the art and, consequently, only a brief description thereof is deemed necessary.

Assuming the master controller to be moved to its initial position *a*, for operation of the motors from the supply circuit of higher voltage, a control circuit is established from one side of the battery B through control finger T to the movable contact members of the controller and thence through the control fingers LS1', LS2', 1' to 6', inclusive, and 21' to the energizing coils of the switches LS1, LS2, 1 to 6, inclusive, and 21 respectively, whereby the motors are disposed in series-circuit relation across the supply circuit of higher voltage with all of the resistors in series with the motors. The main circuit connections are indicated in Fig. 5.

Figure 6:
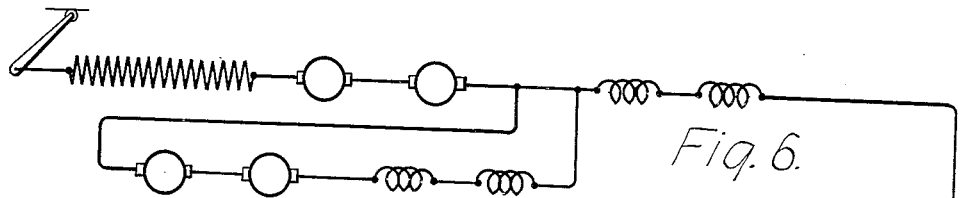
Figure 7:
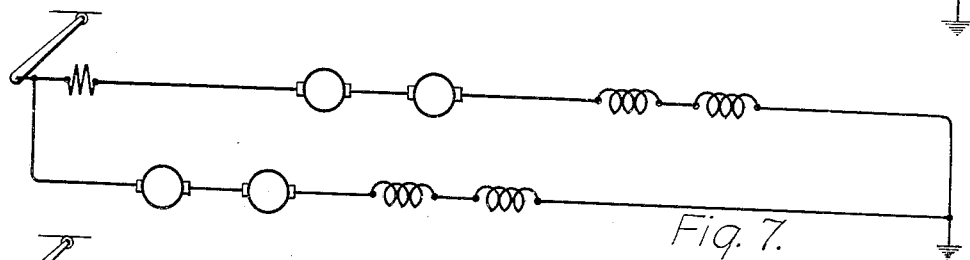
Figure 6A:
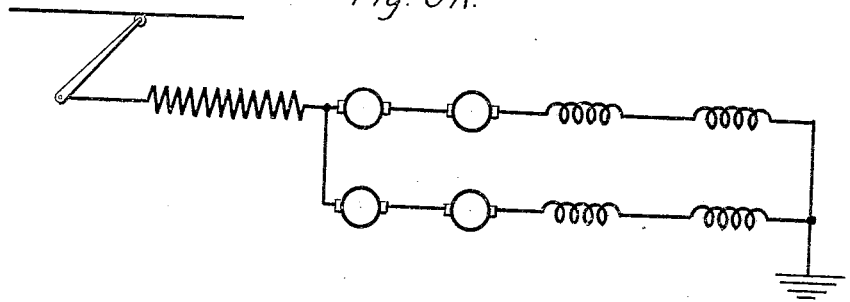

In positions *b* to *f*, inclusive, of the master controller, certain of the resistor switches are closed in accordance with familiar practice and as indicated by the dotted lines in Fig. 5. The operation may be readily followed, inasmuch as each control finger is designated by priming the reference character of the corresponding switch. Two sections of the resistors R4 and R6 remain in circuit throughout the operation of the motors for the purpose of reducing the effect of surges in line voltage and other abnormal conditions, as will be understood. During transition of the motors from series to series-parallel relation, all the resistor switches except R1, are opened and the switch 7 is simultaneously closed, thereby giving the connections shown in Fig. 6, in which one pair of the motors and the corresponding field windings are temporarily short-circuited. The switches 2 and 5 are then opened and switches 8 and 9 are closed as soon as the controller occupies its position *g*. See Fig. 6A. The switches are again successively closed, with the exception of switches R4 and R6, and in the final running position *k*, the connections of the motors are as illustrated in Fig. 7.

Figure 8:
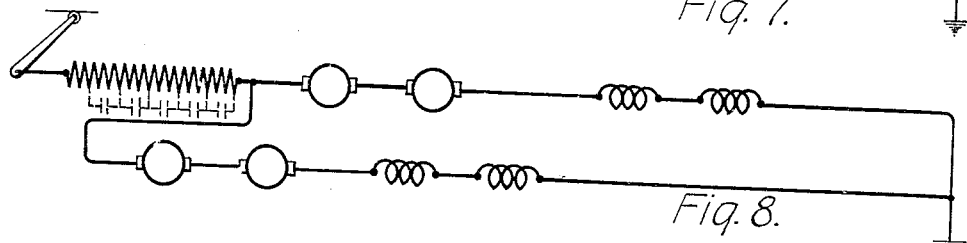
Figure 9:
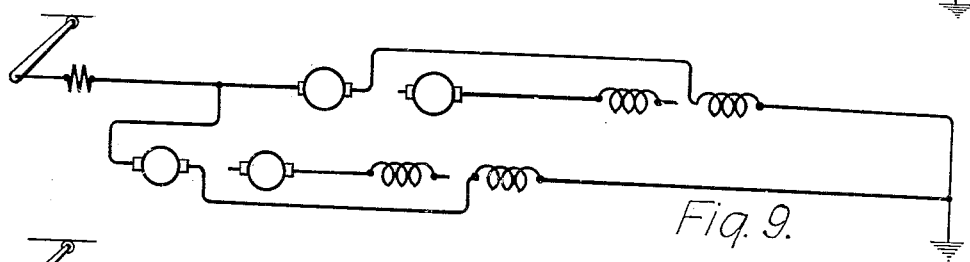

When the motors are to be operated from the supply circuit of lower voltage, the master controller is operated in the reverse direction from that just described. In position *a'*, switches LS1, LS2, 1, 21, 3, 4, 6, 7, 8, 9 and R2 are closed, whereby the motors are connected in series parallel relation with a certain amount of resistance in circuit, as indicated in Fig. 8.

In positions *b'* to *f'*, inclusive, the resistors in circuit are gradually excluded, with the exception of the resistor corresponding to the switch R1, which remains in the motor circuit for a regulating purpose, similar to that hereinbefore described in connection with the operation from the supply circuit of higher voltage.

During the transition from series-parallel to parallel, the resistor switches are first opened, and switches 10 and 13 are then closed. Switches 21, 3, 4 and 6 are next opened, thereby giving the motor connections of Fig. 9, in which only two motors are operative.

Figure 9A:
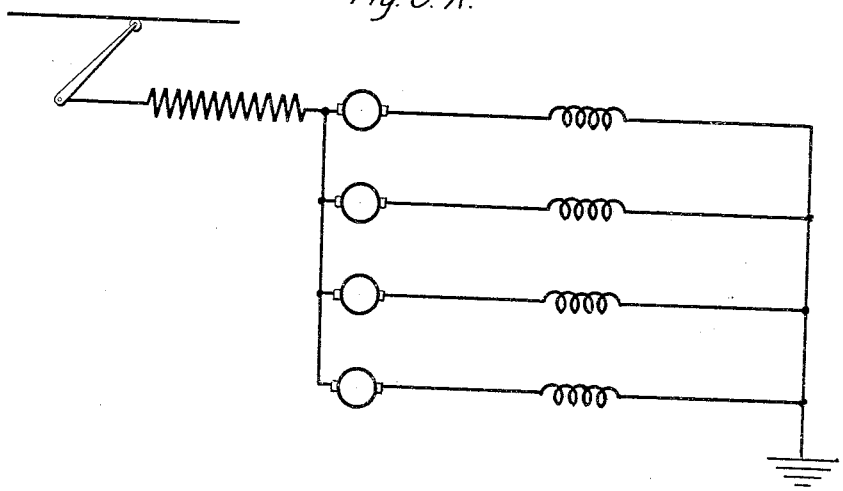

In position *g'*, switches 11, 12, 14 and 15 are closed, thereby disposing the motors in parallel relation with a predetermined amount of resistance in common series-circuit relation to the motors. See Fig. 9A.

Figure 10:
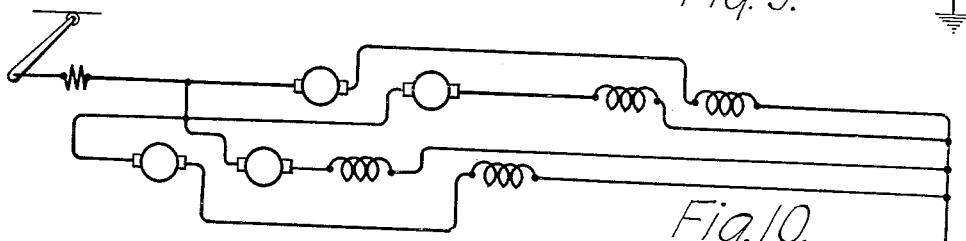

In the positions *h'* to *k'*, inclusive, the resistors are gradually excluded, in a manner similar to that hereinbefore described, and, in the final running position *k'* only, resistors R1 and R2 remain in circuit. The connections are illustrated in Fig. 10.

It will thus be observed that the motor circuit comprises four groups of either two armatures or two field windings. In operation from the circuit of higher voltage, the motors are initially disposed in series-circuit relation, one pair of the motors is then short-circuited temporarily, the positive side of the circuit of the short-circuited machine is then connected to the positive side of the remaining motors, the short circuit is then opened and the negative side of the previously short-circuited motors is connected to the negative side of the supply circuit, whereby the series-parallel connection of the motors is obtained. When operating from the circuit of low voltage, the motors are initially connected in series-parallel relation. The negative, that is to say, "ground" side of one of each of the pairs of armatures is then connected to the positive side of the corresponding field winding, the circuit between the respective pairs of armatures and of field windings is opened, and then the positive side of the remaining armatures is connected to the positive side of the first set of armatures and the "ground" side of the remaining field windings is connected to the "ground" side of the employed supply circuit, whereby the motors are disposed in full parallel relation. Throughout the operation from either the high-voltage or the low-voltage circuit, it will be observed that the field magnet windings are maintained on the "ground" side of the armatures, for a purpose hereinbefore specified.

I do not wish to be restricted to the specific circuit connections or arrangement of parts herein set forth, but intend that only such limitations shall be imposed as are indicated in the appended claims, wherein I desire it to be understood that the term "negative" refers to the side of the winding in question that is nearer to the "ground" side of the supply circuit, it being usual practice to connect the negative side to "ground".

I claim as my invention:

1. A system of control comprising a plurality of supply-circuits of materially different voltages, a plurality of electric motors severally provided with armatures and field magnet windings, and switching means for connecting said motors to either of said supply circuits initially in series or series-parallel and subsequently in series-parallel or parallel circuit relation, according to the supply circuit employed, and for maintaining said field windings on a predetermined side of all the armatures throughout the operation of the motors.

2. A system of control comprising a plurality of supply circuits of materially different voltages, a plurality of electric motors severally provided with armatures and field magnet windings, and switching means for connecting said motors to any one of said supply circuits for series-parallel operation, for maintaining said field windings adapted for direct connection to the "ground" side of the employed supply circuit throughout the operation of the motors and for maintaining the circuit through a portion of said motors uninterrupted.

3. A system of control comprising a plurality of supply circuits of materially different voltages, a plurality of electric motors severally provided with armatures and field magnet windings, and switching means for connecting said motors to either of said supply circuits initially in series or series-parallel and subsequently in series-parallel or parallel circuit relation, according to the supply circuit employed, and for maintaining said field windings adapted for direct connection to the "ground" side of the employed supply circuit throughout the operation of the motors.

4. A system of control comprising a plurality of supply circuits, the voltage of one of which is substantially twice that of the other, four electric motors severally provided with armatures and field magnet windings, and controlling means for connecting said motors to either of said supply circuits initially in series or series-parallel and subsequently in series-parallel or parallel circuit relation, according to the supply circuit employed, and for maintaining said field windings on the "ground" side of the several armatures throughout the operation of the motors.

5. A system of control comprising a plurality of supply circuits of materially different voltages, a plurality of electric motors severally provided with armatures and field magnet windings, and means for connecting said motors to said supply circuits initially in series or series-parallel circuit relation, respectively, said means being adapted, when connected to one of said supply circuits, to subsequently connect the motors in series-parallel relation, and being adapted, when connected to the other supply circuit, to subsequently connect the motors in parallel relation, the field winding connections being adapted to maintain the windings on the "ground" side of the several armatures throughout either complete operation of the motor.

6. A system of control comprising a plurality of supply circuits of materially different voltages, an electric motor circuit embodying a plurality of groups of armatures and of field magnet windings, and means for connecting the motors to said supply circuits initially in series or series-parallel circuit relation, respectively, said means being adapted, when connected to one of said supply circuits, to subsequently connect two adjacent series-connected groups of armatures and field windings in parallel-circuit relation with the remaining two groups, and being adapted, when connected to the other supply circuit, to subsequently connect each armature and its corresponding field winding in parallel-circuit relation with each of the other associated armatures and field windings, the field winding connections being adapted to maintain the windings on the "ground" side of the several armatures throughout either complete operation of the motors.

7. A system of control comprising a plurality of supply circuits, the voltage of one of which is substantially twice that of the other, an electric motor circuit embodying four pairs of armatures and field magnet windings, switching means for connecting the motors to said supply circuits initially in series or series-parallel circuit relation, respectively, other switching means for subsequently connecting two adjacent series-connected pairs of armatures and field windings in parallel-circuit relation with the remaining two pairs when one of the supply circuits is employed, and other switching means for subsequently connecting each armature and its corresponding field windings in parallel-circuit relation with each of the other associated armatures and field windings when the other supply circuit is employed, the switching means connected to the field windings being adapted to maintain the windings on the "ground" side of the several armatures throughout either complete operation of the motors.

8. A system of control comprising a plurality of supply circuits, the voltage of one of which is substantially twice that of the other, an electric motor circuit embodying four pairs of armatures and field magnet windings, switching means for connecting the motors to one of said supply circuits with the field windings initially in series-circuit relation with all the motor armatures, subsequently temporarily short-circuiting one pair of armatures and the corresponding field windings, connecting the positive side of the circuit of the short-circuited machines to the positive side of the remaining motors, opening the short-circuit and connecting the "ground" side of the previously short-circuited motors to the "ground" side of the employed supply circuit, whereby the motors are connected in series-parallel circuit relation, and switching means for connecting the motors to the other supply circuit initially in series-parallel circuit relation, each pair of motors having the armatures and field windings respectively grouped together, connecting the "ground" side of one of each pair of armatures to the positive side of the corresponding field winding, subsequently opening the circuit between the respective pairs of armatures and of field windings, connecting the positive sides of the remaining armatures to the positive side of the first, and connecting the "ground" side of the remaining field windings to the "ground" side of the employed supply circuit, whereby the motors are connected in parallel-circuit relation, the switching means connected to the field windings being adapted to maintain the windings on the "ground" side of the several armatures throughout either complete operation of the motors.

In testimony whereof, I have hereunto subscribed my name this 18th day of Apr., 1914.

NORMAN W. STORER.

Witnesses:
JACOB STAIR, Jr.,
B. B. HINES.